(12) United States Patent
Champagne et al.

(10) Patent No.: US 7,494,341 B2
(45) Date of Patent: Feb. 24, 2009

(54) FARRIER TRAINING SYSTEM

(76) Inventors: Wesley Jon Champagne, 2355 Midlothian Dr., Altadena, CA (US) 91001; Robert F. Champagne, P.O. Box 456, Ramona, CA (US) 92003

( * ) Notice: Subject to any disclaimer, the term of this patent is extended or adjusted under 35 U.S.C. 154(b) by 0 days.

(21) Appl. No.: 11/738,286

(22) Filed: Apr. 20, 2007

(65) Prior Publication Data

US 2008/0257562 A1    Oct. 23, 2008

(51) Int. Cl.
  G09B 19/00    (2006.01)
  A01L 11/00    (2006.01)
(52) U.S. Cl. .......................................... 434/225; 168/45
(58) Field of Classification Search ................... 168/44, 168/17, 45
See application file for complete search history.

(56) References Cited

U.S. PATENT DOCUMENTS

| | | | |
|---|---|---|---|
| 589,982 A | 9/1897 | Rousseau | |
| 933,535 A | 9/1909 | De Vries | |
| 2,721,419 A | 10/1955 | Carstensen | |
| 2,846,810 A | 8/1958 | Ory | |
| 3,309,791 A | 3/1967 | Kelley et al. | |
| 3,406,969 A | 10/1968 | Tisdell et al. | |
| 3,716,941 A | 2/1973 | Dowden et al. | |
| 3,952,449 A * | 4/1976 | Terzian | 446/382 |
| 4,203,233 A | 5/1980 | Crane | |
| 4,224,744 A | 9/1980 | Siegel et al. | |
| 4,810,196 A | 3/1989 | Walker | |
| 4,964,836 A * | 10/1990 | Kamei | 446/374 |
| 5,192,210 A | 3/1993 | Thomas et al. | |
| 5,484,290 A | 1/1996 | Fisher | |
| 5,853,293 A | 12/1998 | Weber et al. | |
| 5,957,694 A | 9/1999 | Bunch | |
| 6,109,921 A | 8/2000 | Yau | |
| 6,165,043 A * | 12/2000 | Terzian et al. | 446/356 |
| 6,676,509 B1 | 1/2004 | Bear | |
| 7,101,186 B1 | 9/2006 | Hughes | |

* cited by examiner

*Primary Examiner*—Son T. Nguyen
(74) *Attorney, Agent, or Firm*—David A. Belasco; Belasco Jacobs & Townsley, LLP

(57) ABSTRACT

A farrier training system includes an artificial leg portion attached to an artificial hoof portion. The hoof portion is removably attached to the lower end of the leg portion. The leg is articulated with at least one spring-loaded joint to simulate a real horse's leg and train the farrier in proper shoeing techniques. The removable hoof portion is replaceable with hoof portions exhibiting typical hoof diseases and abnormalities. The hoof portion is carvable and indicates through color changes when the hoof portion has been carved too deeply. The hoof portion is also nailable and includes the ability to indicate when nails have been inserted too deeply. Horseshoe stock is provided along with tools for forming the stock into horseshoes fitted to the removable hoof portion. A support platform is provided to allow the upper end of the leg portion to be removably attached to a fixture, building or ground surface.

16 Claims, 5 Drawing Sheets

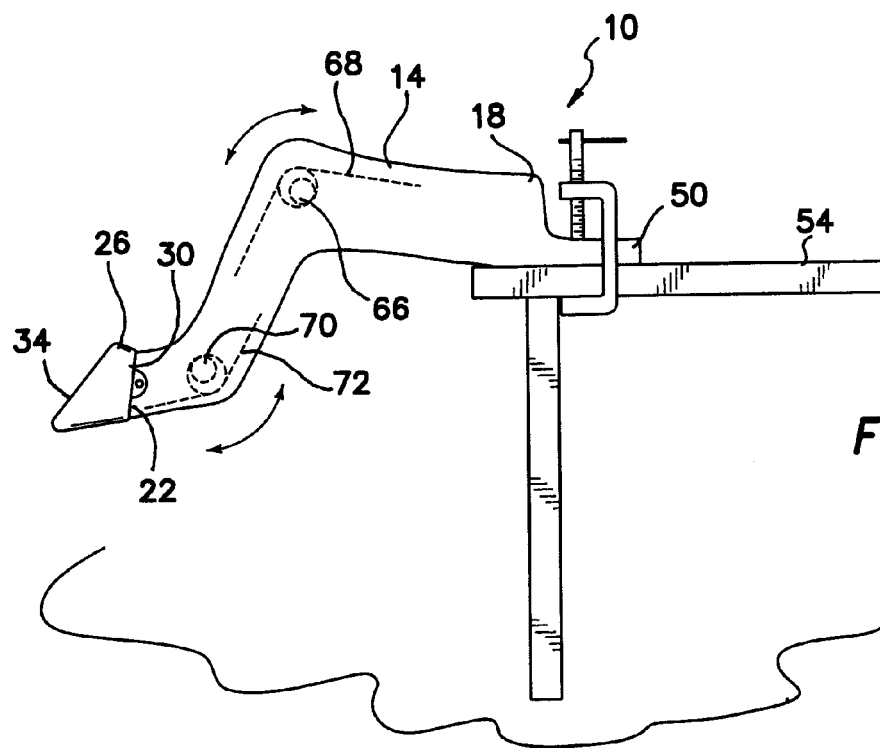
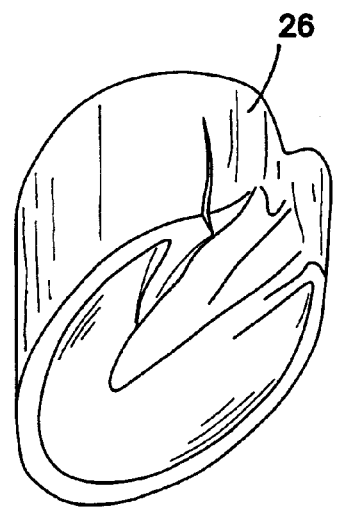
FIG. 2
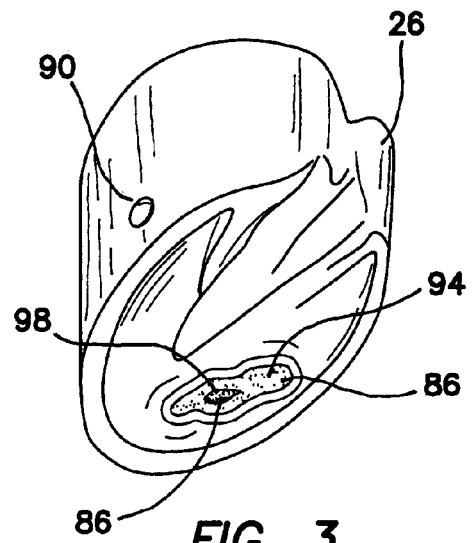
FIG. 3

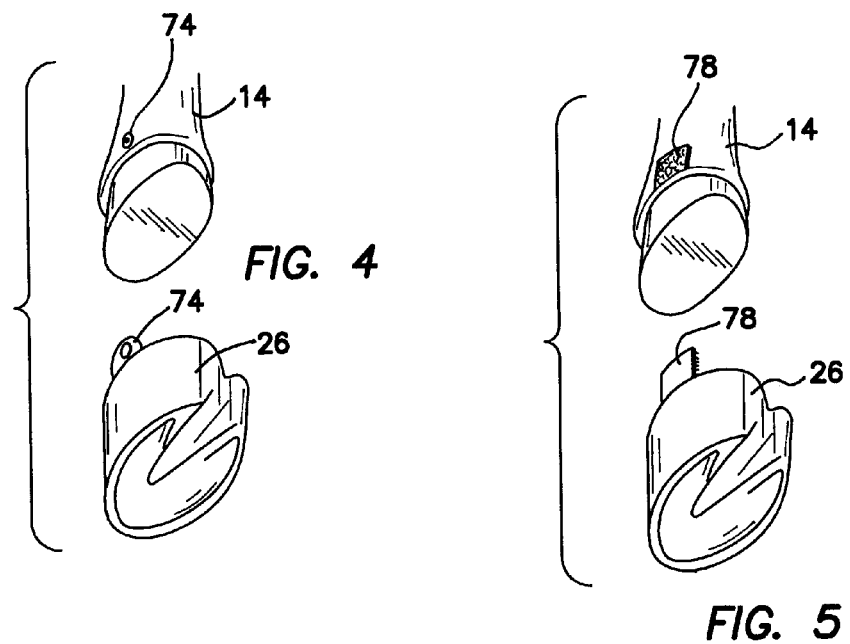
FIG. 4
FIG. 5
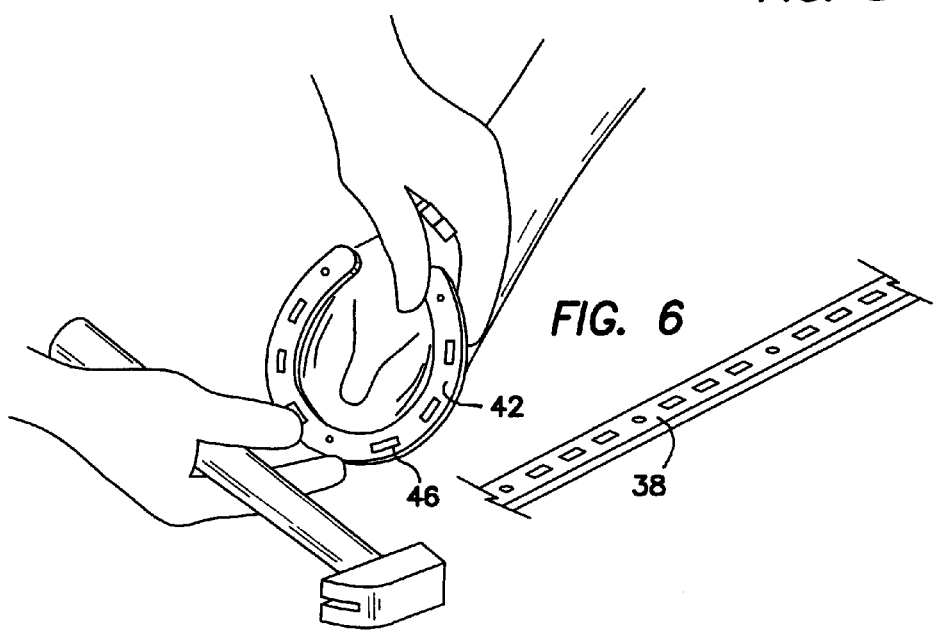
FIG. 6

FIG. 17A
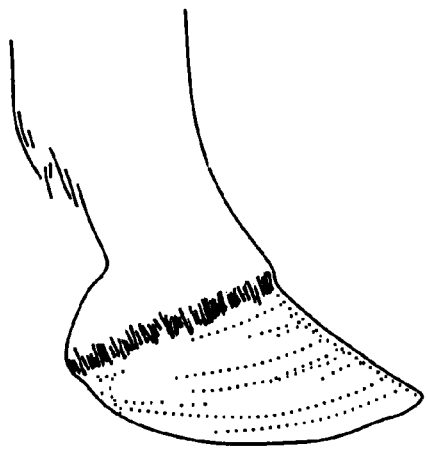
FIG. 17B
FIG. 17C
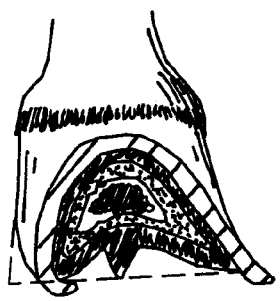
FIG. 17D
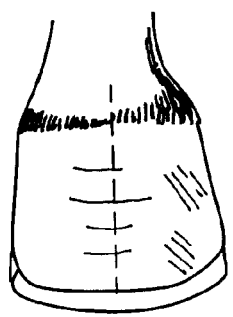
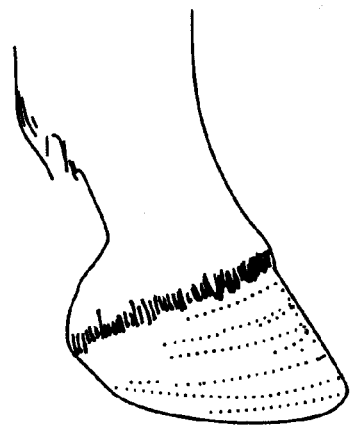
FIG. 17E

FARRIER TRAINING SYSTEM

FIELD OF INVENTION

This invention relates to the field of training systems, and more specifically to a training system for teaching farriers to make and attach horseshoes to the hooves of horses.

BACKGROUND OF THE INVENTION

The horse's hoof is composed of five major regions: the wall, the sole, the frog, the periople and the white line. The hoof grows as a result of cell division in the outer horn-producing cell layer of the sensitive structures of the hoof, namely the perioplic ring, the coronary band and the sensitive laminae. This process may be affected by many factors such as diet, stresses, injuries and diseases. In such cases, a distorted hoof is often produced. The hoof wall is of primary concern. It bears most of the horse's weight, is the most subject to wear and trauma and is the point of attachment of horseshoes, an invention designed to protect the hoof wall from rough terrain. Horseshoes have been employed for hundreds of years to help alleviate trauma to the horse's hooves, improve traction and to help heal damaged hooves.

The design and application of horse shoes requires the hands-on, personal attention of the farrier, previously known as a blacksmith. The farrier's job entails studying the hooves of a horse to be shod and selecting, adapting and even manufacturing horse shoes suitable to the individual horse. While there is substantial similarity in horse hooves, there are also many variations due to the factors mentioned above and simply due to genetic factors. After selecting and/or manufacturing suitable horse shoes, the farrier must safely install the horse shoes on the hooves of the horse. As horses tend to weigh 1000 lbs. or more and may have difficult personalities, the attachment of a horseshoe to the hoof of a horse without injury to the horse or the farrier is a task requiring considerable skill. Further complicating the work is the fact that the hoof must usually be trimmed to mate properly with the horseshoe and the shoe is typically attached with nails. If the nails are driven too deeply into the hoof, delicate capillaries may be injured and bleeding, discomfort and even infection may result.

Until recently, farriers were often trained using legs cut from dead horses. Recent legislation has severely limited such practices. The present invention addresses all of these problems in the training of farriers.

U.S. Pat. No. 2,721,419, issued to Carstensen, discloses a toy horse. This device includes a body portion, a neck portion and a head portion. Depending from the body portion are leg members, each comprising an upper section, a lower section and a hoof. Attached to the hoof portion of each leg by means of simulated horseshoe nails is a simulated horseshoe. The horseshoes are capable of application to and removal from the hooves by a child. The hooves should be formed of a material suitable to receive the nails and from which these nails may subsequently be withdrawn. Such a material may be a soft wood, such as balsa or yucca. A resilient material such as rubber may also be suitable for this purpose. However, wood will generally be preferable inasmuch as the pounding of nails thereinto is accompanied with a good deal of noise; the creation of such noise having a great deal of appeal to children.

U.S. Pat. No. 5,853,293, issued to Weber et al. is directed to a medical teaching aid. This device comprises a main body portion formed in the shape of a human foot, a fabric conforming to the main body portion, and selected facsimiles of foot conditions which are selectively and releasably received by and retained on the fabric. Alternatively, the medical teaching aid includes simulated nails which also are selectively and releasably received by and retained on the fabric. The selected facsimiles may be prepared from cloth that will conform to the shape of the main body portion when applied to the outer surface of the fabric. The selected facsimiles may contain indicia representing the visual appearance of specific foot disorders.

U.S. Pat. No. 3,309,791, issued to Kelly et al. illustrates an artificial insemination teaching apparatus. This device comprises a rigid housing having an exterior configuration simulating the posterior of the animal for which instruction is being given. In operation, a course of instruction in the technique of artificial insemination utilizing this device involves having the student practice the identical steps on the teaching apparatus which are performed on the live animal during an actual insemination. While the student endeavors to perform this operation, the instructor stands back of wall of the housing and grasps a control handle in one hand and selectively pumps air into or releases air out of the double-walled cavity. During the instruction period, the instructor also pivots the housing by means of the handle. The pedestal and hinged mounting plates support the housing for pivotal movement about a vertical axis located forward of flexible wall and upon a horizontal axis parallel to and forward of the flexible wall so that the instructor may simulate typical side-to-side and up-and-down movements of a live animal during the insemination procedure. By appropriate movement of the body and introduction of air into the hollow walls of the cavity member, the instructor can create conditions that are at least as arduous as those present when working with live animals so that the student develops substantial skill with the teaching apparatus.

U.S. Pat. No. 4,810,196, issued to Walker disclose a mannequin for use in teaching cosmetology. This device, mannequin, includes a face portion, scalp, neck, and hair which is permanently attached to the scalp by conventional means. A base member supports the mannequin on a table. The hair includes a patterned section comprised of a plurality of colored line diagrams whereby the individual strands of hair or sections of hair are imprinted or coated with coloring material to indicate a line of cutting or other work application. Each of the line diagrams is preferably a different color, but it is possible in alternate embodiments to have fewer diagrams, utilize only one color and have them spaced apart, separated by the natural hair color. The coloring material used may be selected from any of the contemporary, multiple colors of dye used for temporarily coloring the hair; may be permanent dyes of any kind compatible with human hair; or acrylics which are applied to the surface of the hair shaft. Further, it is anticipated that invisible inks visible only under ultra violet light might be used. The ends of the hair, up to the line "h" are (example only) indicated as being red and on the actual model, the red line diagram might be approximately three-quarters of an inch to one inch depth. In use, a student would be instructed to take off approximately one-third of the red portion, for a first hair cut. The instructor would then evaluate the cut and the student would be instructed to repeat the cut one or two more times, removing the entire red diagram.

It is an objective of the present invention to provide a system to teach farriers to trim horse hooves in preparation for shoeing. It is a further objective to provide such a system that will allow the farrier to practice installation of horseshoes on an artificial hoof. It is a still further objective of the invention to provide for artificial hooves that simulate various hoof formation problems. It is yet a further objective to provide artificial hooves that are nailable, replaceable and that simulate the problems associated with attaching the shoe to the horse's hoof improperly. Finally, it is an objective of the present invention to provide an apparatus that simulates the postures necessary to properly hold the horse's leg for shoeing.

While some of the objectives of the present invention are disclosed in the prior art, none of the inventions found include all of the requirements identified.

SUMMARY OF THE INVENTION

The present invention addresses all of the deficiencies of prior art farrier training system inventions and satisfies all of the objectives described above.

(1) A farrier training system providing the desired features may be constructed from the following components. An artificial leg portion is provided. The leg portion is formed of substantially rigid material and has an upper end and a lower end. An artificial hoof portion is provided. The hoof portion has an upper end and a lower end and is removably attached at the upper end to the lower end of the leg portion. Horseshoe stock is provided. The horseshoe stock is formable into horseshoes sized and shaped to fit the hoof portion. Means are provided for attaching the horseshoes to the hoof portion.

(2) In a variant of the invention, a support platform is provided. The platform is removably attached to any of a fixture, building or ground surface. The support platform is removably attached to the upper end of the leg portion.

(3) In another variant, the leg portion further includes at least one movable joint.

(4) In still another variant, the at least one movable joint is spring loaded. The spring loading causes the leg portion to straighten.

(5) In yet another variant, the hoof portion is attached to the lower end of the leg portion adjacent a lower movable joint.

(6) In a further variant, the at least one lower movable joint is spring loaded. The spring loading causes the hoof portion to straighten with respect to the leg portion.

(7) In yet a further variant, the hoof portion is attached to the leg portion with a mechanical latching mechanism.

(8) In another variant of the invention, the hoof portion is attached to the leg portion with hooking member and looping member attachment means.

(9) In still another variant, the hoof portion is attached to the leg portion with an adhesive.

(10) In yet another variant, the adhesive is selected from the group consisting of: epoxy and cyanoacrylate.

(11) In a further variant, the hoof portion is nailable and carvable.

(12) In yet a further variant, the hoof portion is formed from material selected from the group consisting of wood, plastic, rubber, silicone, polyurethane, adhesive and epoxy.

(13) In another variant of the invention, the hoof portion includes means for indicating when the hoof portion has been carved beyond a first predetermined limit.

(14) In still another variant, the hoof portion includes means for indicating when the hoof portion has been nailed beyond a second predetermined limit.

(15) In yet another variant, the indicating means produces a first color change in the hoof portion.

(16) In a further variant, the indicating means produces a second color change in the hoof portion.

(17) In yet a further variant, the system comprises alternative hoof portions, each of the hoof portions simulating different normal, abnormal, deformed or cracked hoof conditions.

(18) In another variant of the invention, tools for forming the horseshoe stock into horseshoes sized and shaped to fit the hoof portion are provided.

(19) In a final variant, the means for attaching the horseshoes to the hoof portion is selected from the group consisting of: nailing, gluing and attaching with clips.

An appreciation of the other aims and objectives of the present invention and an understanding of it may be achieved by referring to the accompanying drawings and the detailed description of a preferred embodiment.

DESCRIPTION OF THE DRAWINGS

FIG. 1 is a side elevational view of the preferred embodiment of the invention illustrating attachment of the invention to a fixture;

FIG. 2 is a perspective view of a cracked, removable hoof portion of the FIG. 1 embodiment;

FIG. 3 is a perspective view of a carved, removable hoof portion of the FIG. 1 embodiment, illustrating the results of proper and improper carving and the results of nailing a horseshoe to the hoof portion too deeply;

FIG. 4 is a perspective view of a first embodiment of a means of attaching a removable hoof portion to the leg portion;

FIG. 5 is a perspective view of a second embodiment of a means of attaching a removable hoof portion to the leg portion;

FIG. 6 is a perspective view of the fitting of a horseshoe to the removable hoof portion of the FIG. 1 embodiment;

FIG. 17A is a front view of a normal hoof in untrimmed condition;

FIG. 17B is a side elevational view of a normal hoof in untrimmed condition;

FIG. 17C is a partial sectional front view of a normal hoof in untrimmed condition;

FIG. 17D is a front view of a normal hoof after trimming;

FIG. 17E is a side elevational view of a normal hoof after trimming; and

DETAILED DESCRIPTION OF THE PREFERRED EMBODIMENT (1) FIGS. 1 and 18 illustrate a farrier training system 10 providing the desired features that may be constructed from the following components. An artificial leg portion 14 is provided. The leg portion 14 is formed of substantially rigid material and has an upper end 18 and a lower end 22. An artificial hoof portion 26 is provided. The hoof portion 26 has an upper end 30 and a lower end 34 and is removably attached at the upper end 30 to the lower end 22 of the leg portion 14. As illustrated in FIG. 6, horseshoe stock 38 is provided. The horseshoe stock 38 is formable into horseshoes 42 sized and shaped to fit the hoof portion 26. Means 46 are provided for attaching the horseshoes 42 to the hoof portion 26.

Figure 7A:
FIG. 7A is a side elevational view of a hoof with a contracted or sheared heel.

(2) In a variant of the invention, as illustrated in FIG. 1, a support platform 50 is provided. The platform 50 is removably attached to any of a fixture 54, building (not shown) or ground surface (not shown). The support platform 50 is removably attached to the upper end 18 of the leg portion 14.

(3) In another variant, the leg portion 14 further includes at least one movable joint 66.

(4) In still another variant, the at least one movable joint 66 is spring loaded 68. The spring loading causes the leg portion 14 to straighten.

(5) In yet another variant, the hoof portion 26 is attached to the lower end 22 of the leg portion 14 adjacent a lower movable joint 70.

(6) In a further variant, the at least one lower movable joint 70 is spring loaded 72. The spring loading causes the hoof portion 26 to straighten with respect to the leg portion 14.

(7) In yet a further variant, as illustrated in FIG. 4, the hoof portion 26 is attached to the leg portion 14 with a mechanical latching mechanism 74.

(8) In another variant of the invention, as illustrated in FIG. 5, the hoof portion 26 is attached to the leg portion 14 with hooking member and looping member attachment means 78.

(9) In still another variant, the hoof portion 26 is attached to the leg portion 14 with an adhesive (not shown).

(10) In yet another variant, the adhesive is selected from the group consisting of: epoxy and cyanoacrylate.

(11) In a further variant, as illustrated in FIGS. 2 and 3, the hoof portion 26 is nailable and carvable.

(12) In yet a further variant, the hoof portion 26 is formed from material selected from the group consisting of wood, plastic, rubber, silicone, polyurethane, adhesive and epoxy.

(13) In another variant of the invention, the hoof portion 26 includes means 86 for indicating when the hoof portion 26 has been carved beyond a first predetermined limit.

(14) In still another variant, the hoof portion 26 includes means 90 for indicating when the hoof portion 26 has been nailed beyond a second predetermined limit.

(15) In yet another variant, the indicating means 86 produces a first color change 94 in the hoof portion 26.

(16) In a further variant, the indicating means 90 produces a second color change 98 in the hoof portion 26.

Figure 7B:
FIG. 7B is an upward looking plan view of a hoof with a contracted heel.
Figure 8:
FIG. 8 is a side elevational view of a hoof with an underslung heel.
Figure 9:
FIG. 9 is a side elevational view of a hoof illustrating a dubed foot condition.
Figure 10:
FIG. 10 is an upward looking plan view of a hoof illustrating a mule foot condition.
Figure 11:
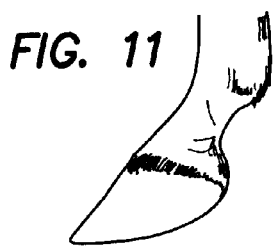
FIG. 11 is a side elevational view of a hoof illustrating a coon foot condition.
Figure 12:
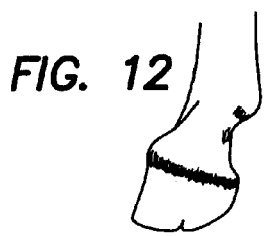
FIG. 12 is a side elevational view of a hoof illustrating a club foot condition.
Figure 13:
FIG. 13 is a side elevational view of a hoof illustrating a false quarter condition.
Figure 14:
FIG. 14 is a side elevational view of a hoof illustrating a drooped sole or stumpy heel condition.
Figure 15:
FIG. 15 is an upward looking plan view of a hoof illustrating a brittle foot condition.
Figure 16A:
FIG. 16A is an upward looking plan view of a normal hoof.
Figure 16B:
FIG. 16B is a front view of a normal hoof.
Figure 16C:
FIG. 16C is a side elevational view of a normal hoof.
Figure 18:
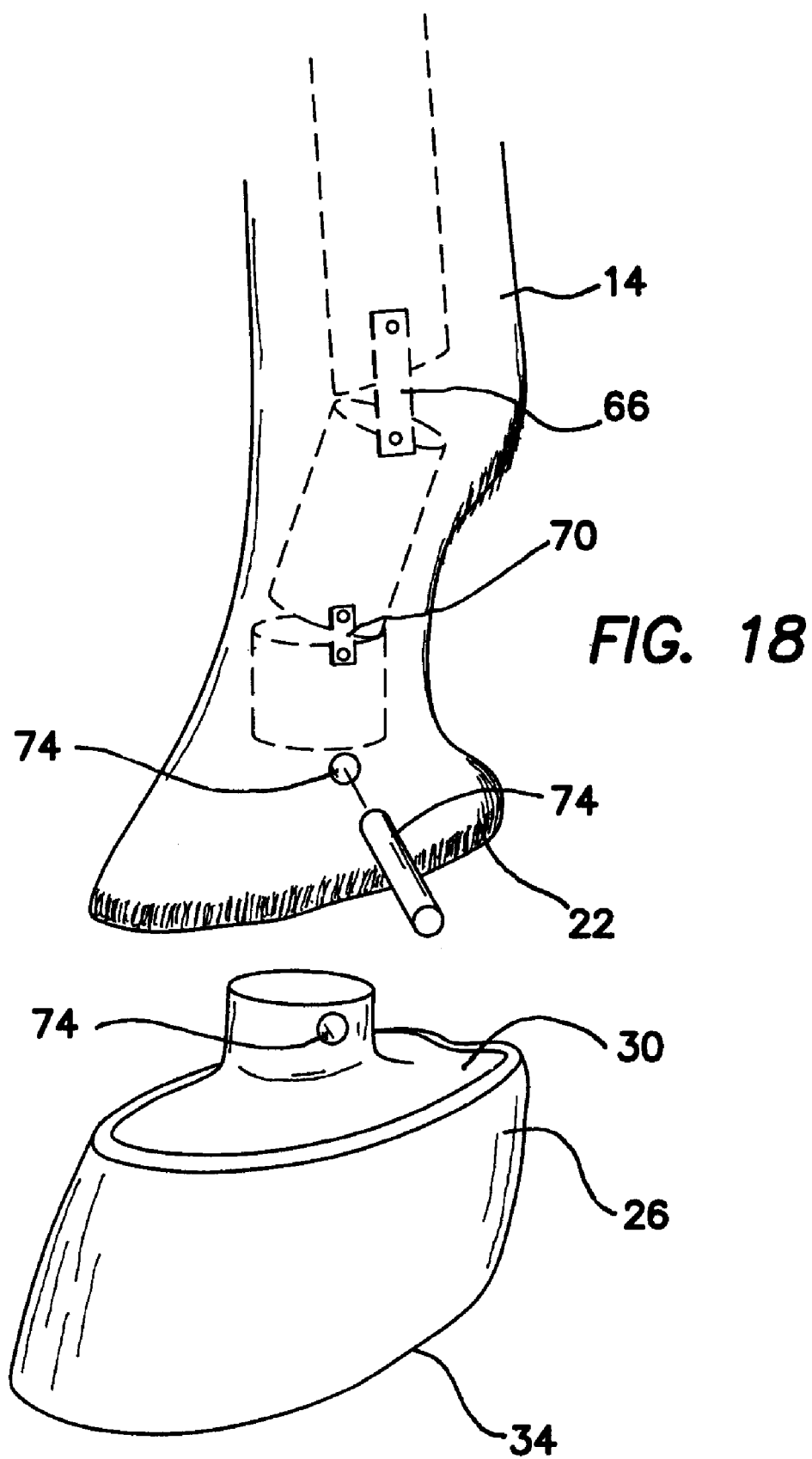
FIG. 18 is a perspective view of an alternative embodiment of the invention.

(17) In yet a further variant, the system 10 comprises alternative hoof portions 26, each of the hoof portions 26 simulating different normal, abnormal, deformed or cracked hoof conditions. See FIGS. 2 and 7-17.

(18) In another variant of the invention, tools for forming the horseshoe stock 38 into horseshoes 42 sized and shaped to fit the hoof portion 26 are provided.

(19) In a final variant, the means 46 for attaching the horseshoes 42 to the hoof portion 26 is selected from the group consisting of: nailing, gluing and attaching with clips.

The farrier training system 10 has been described with reference to particular embodiments. Other modifications and enhancements can be made without departing from the spirit and scope of the claims that follow.

The invention claimed is:

1. A farrier training system, comprising:
   an artificial leg portion, said leg portion being formed of substantially rigid material and having an upper end and a lower end;
   an artificial hoof portion, said hoof portion having an upper end and a lower end and being removably attached at said upper end to said lower end of said leg portion;
   said hoof portion being nailable and carvable;
   a first means for indicating when said hoof portion has been carved beyond a first predetermined limit;
   a second means for indicating when said hoof portion has been nailed beyond a second predetermined limit;
   horseshoe stock, said horseshoe stock being formable into horseshoes sized and shaped to fit said hoof portion; and
   means for attaching said horseshoes to said hoof portion.

2. The farrier training system, as described in claim 1, further comprising:
   a support platform, said platform being removably attached to any of a fixture, building and ground surface; and
   said support platform being removably attached to said upper end of said leg portion.

3. The farrier training system, as described in claim 1, wherein said leg portion further comprises at least one movable joint.

4. The farrier training system, as described in claim 3, wherein said at least one movable joint is spring loaded, said spring loading causing said leg portion to straighten.

5. The farrier training system, as described in claim 1, wherein said hoof portion is attached to said lower end of said leg portion adjacent a lower movable joint.

6. The farrier training system, as described in claim 5, wherein said at least one lower movable joint is spring loaded, said spring loading causing said hoof portion to straighten with respect to said leg portion.

7. The farrier training system, as described in claim 1, wherein said hoof portion is attached to said leg portion with a mechanical latching mechanism.

8. The farrier training system, as described in claim 1, wherein said hoof portion is attached to said leg portion with hooking member and looping member attachment means.

9. The farrier training system, as described in claim 1, wherein said hoof portion is attached to said leg portion with an adhesive.

10. The farrier training system, as described in claim 9, wherein the adhesive is selected from the group consisting of: epoxy and cyanoacrylate.

11. The farrier training system, as described in claim 1, wherein said hoof portion is formed from material selected from the group consisting of: wood, plastic, rubber, silicone, polyurethane, adhesive and epoxy.

12. The farrier training system, as described in claim 1, wherein said indicating first means produces a first color change in said hoof portion.

13. The farrier training system, as described in claim 1, wherein said indicating second means produces a second color change in said hoof portion.

14. The farrier training system, as described in claim 1, wherein said system comprises alternative hoof portions, each of said hoof portions simulating different normal, abnormal, deformed or cracked hoof conditions.

15. The farrier training system, as described in claim 1, further comprising tools for forming said horseshoe stock into horseshoes sized and shaped to fit said hoof portion.

16. The farrier training system, as described in claim 1, wherein said means for attaching said horseshoes to said hoof portion is selected from the group consisting of: nailing, gluing and attaching with clips.

* * * * *